United States Patent
Snyder et al.

(10) Patent No.: US 10,465,503 B2
(45) Date of Patent: Nov. 5, 2019

(54) SYSTEMS AND METHODS FOR DOWNHOLE BHA INSULATION IN MAGNETIC RANGING APPLICATIONS

(75) Inventors: John K. Snyder, Edmonton (CA); Michael D. Finke, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/698,575

(22) PCT Filed: May 20, 2011

(86) PCT No.: PCT/US2011/037429
§ 371 (c)(1),
(2), (4) Date: Nov. 16, 2012

(87) PCT Pub. No.: WO2011/146889
PCT Pub. Date: Nov. 24, 2011

(65) Prior Publication Data
US 2013/0068526 A1    Mar. 21, 2013

Related U.S. Application Data

(60) Provisional application No. 61/347,161, filed on May 21, 2010.

(51) Int. Cl.
*E21B 47/12* (2012.01)
*E21B 47/022* (2012.01)
*G06F 17/00* (2019.01)

(52) U.S. Cl.
CPC ........ *E21B 47/12* (2013.01); *E21B 47/02216* (2013.01); *G06F 17/00* (2013.01)

(58) Field of Classification Search
None
See application file for complete search history.

(56) References Cited

U.S. PATENT DOCUMENTS 2,557,168 A   6/1951 Arps et al.
2,920,266 A   1/1960 Owen
(Continued)

OTHER PUBLICATIONS

Filippov, Andrei, et al. "Expandable tubular solutions." SPE annual technical conference. 1999.*
(Continued)

*Primary Examiner* — Rehana Perveen
*Assistant Examiner* — Nithya J. Moll
(74) *Attorney, Agent, or Firm* — Haynes and Boone, LLP

(57) ABSTRACT

A ranging system includes a drill string comprising a bottom hole assembly (BHA). A plurality of ranging devices are positioned in a spaced-apart orientation on the drill string and are operable to provide a conducting contact with a formation. At least one insulator member is positioned on the drill string between the plurality of ranging devices and is operable to provide a non-conducting contact with the formation. During drilling operations, the plurality of ranging devices provide conducting contact with a formation while the at least one insulator member provides non-conducting contact with the formation so to enhancing ranging operations while drilling. A method of modeling and simulating drill string response is provided to identify locations along the drill string for positioning insulator members.

23 Claims, 17 Drawing Sheets

(56) References Cited

U.S. PATENT DOCUMENTS

| | | | |
|---|---|---|---|
| 4,494,072 A * | 1/1985 | Jeter | E21B 17/003 |
| | | | 175/321 |
| 4,575,681 A | 3/1986 | Grosso et al. | |
| 5,678,630 A | 10/1997 | Shaw et al. | |
| 6,179,066 B1 | 1/2001 | Nasr et al. | |
| 6,364,039 B1 * | 4/2002 | Majkovic | E21B 17/073 |
| | | | 175/320 |
| 6,957,708 B2 | 10/2005 | Chemali et al. | |
| 7,066,282 B2 | 6/2006 | Chen et al. | |
| 7,310,580 B2 * | 12/2007 | Zhou et al. | 702/6 |
| 2004/0010373 A1 * | 1/2004 | Smits et al. | 702/6 |
| 2005/0197777 A1 * | 9/2005 | Rodney et al. | 702/9 |
| 2005/0267719 A1 | 12/2005 | Foucault | |
| 2006/0028321 A1 | 2/2006 | Kennedy et al. | |
| 2006/0124360 A1 | 6/2006 | Lee et al. | |
| 2008/0154563 A1 * | 6/2008 | Kumar et al. | 703/10 |
| 2008/0275648 A1 | 11/2008 | Illfelder | |
| 2009/0006053 A1 | 1/2009 | Carazzone et al. | |
| 2009/0164127 A1 | 6/2009 | Clark | |
| 2009/0255661 A1 | 10/2009 | Clark et al. | |
| 2009/0260878 A1 | 10/2009 | Morley et al. | |
| 2010/0071794 A1 | 3/2010 | Holman et al. | |

OTHER PUBLICATIONS

Izadpanah, Saeed, G. Rashed, and Sina Sodagar. "Using ultrasonic guided waves in evaluation of pipes." The 2nd International Conference on Technical Inspection and NDT],(Oct. 2008). 2008.*

PCT International Search Report, dated Sep. 15, 2011, 3 pages, PCT/US2011/037429, United States Patent and Trademark Office.

PCT Written Opinion of the International Searching Authority, dated Sep. 15, 2011, 6 pages, PCT/US2011/037429, United States Patent and Trademark Office.

Chen, David C. K., "Integrated BHA Modeling Delivers Optimal BHA Design," SPE/IADC Middle East Drilling and Technology Conference, Oct. 22-24, 2007, Cairo, Egypt, 2007, SPE/IADC Middle East Drilling Technology Conference & Exhibition, Abstract Paper No. 10635-MA.

Miska, Stefan Z., "Wellbore Tubulars," Technology Focus, May 2009, Society of Petroleum Engineers, JPT, pp. 74-82.

PCT International Preliminary Report on Patentability, dated Dec. 6, 2012, 2 pages, PCT/US2011/037429, United States Patent and Trademark Office.

Examination Report, Australian Patent Application No. 2011255225, Sep. 9, 2014, 4 pages.

Australian Examination Report issued for Application No. 2016200837 dated Apr. 26, 2017, 3 pages.

* cited by examiner

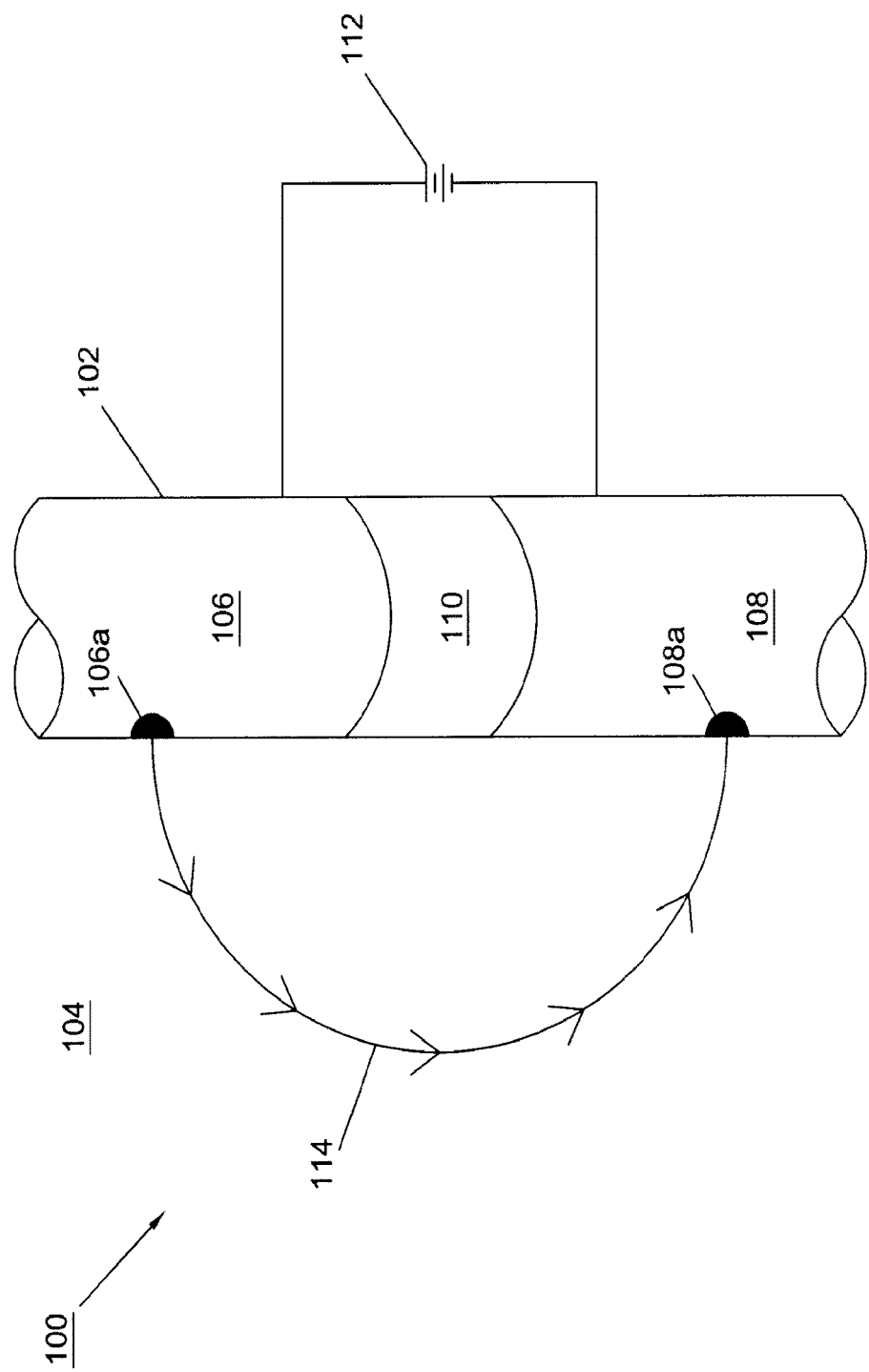

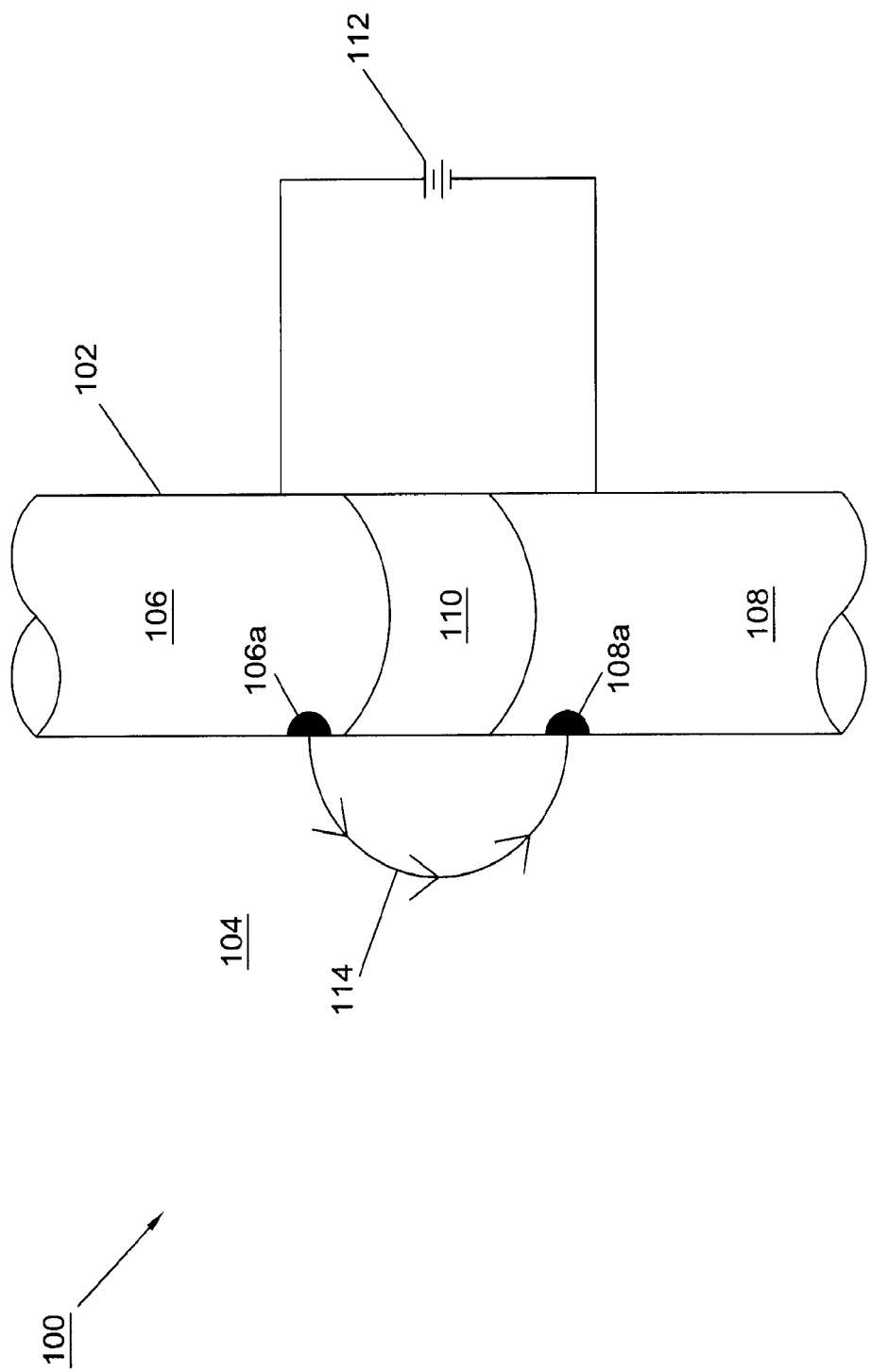

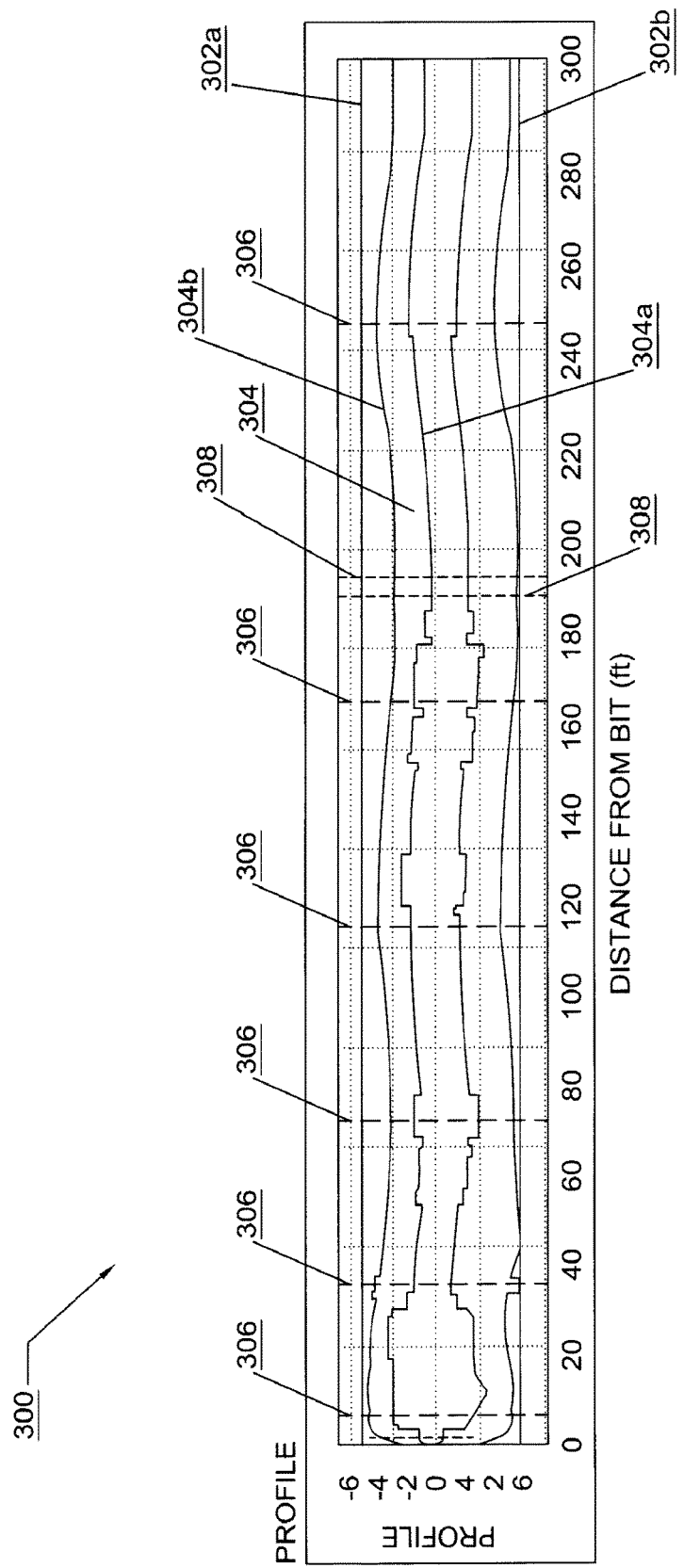

| From Bit | Side Force | Deflection | Slope | Shear Force | Moment | Description |
|---|---|---|---|---|---|---|
| (ft) | (lbf) | (in) | (deg) | (lbf) | (f-p) | |
| 0.00 | -2755 | 0.000 | 0.095 | -2756 | 0 | Bit |
| 5.74 | 3260 | -0.063 | -0.342 | 548 | -15667 | Stab |
| 28.43 | -1255 | 0.125 | -0.010 | -133 | 523 | Stab |
| 58.72 | -674 | 0.125 | 0.054 | -304 | 3448 | Stab |
| 105.21 | -671 | 0.062 | -0.004 | -86 | 5092 | Stab |
| 150.37 | -480 | 0.540 | 0.139 | -672 | 1682 | Stab |
| 168.60 | -620 | 0.874 | 0.004 | 23 | -515 | Contact |
| 176.10 | -239 | 0.874 | -0.001 | -73 | 193 | Contact |
| 185.50 | -415 | 0.874 | 0.002 | -308 | 353 | Contact |
| 230.22 | -1786 | 0.250 | -0.014 | -639 | 7205 | Stab |

FIG. 4b

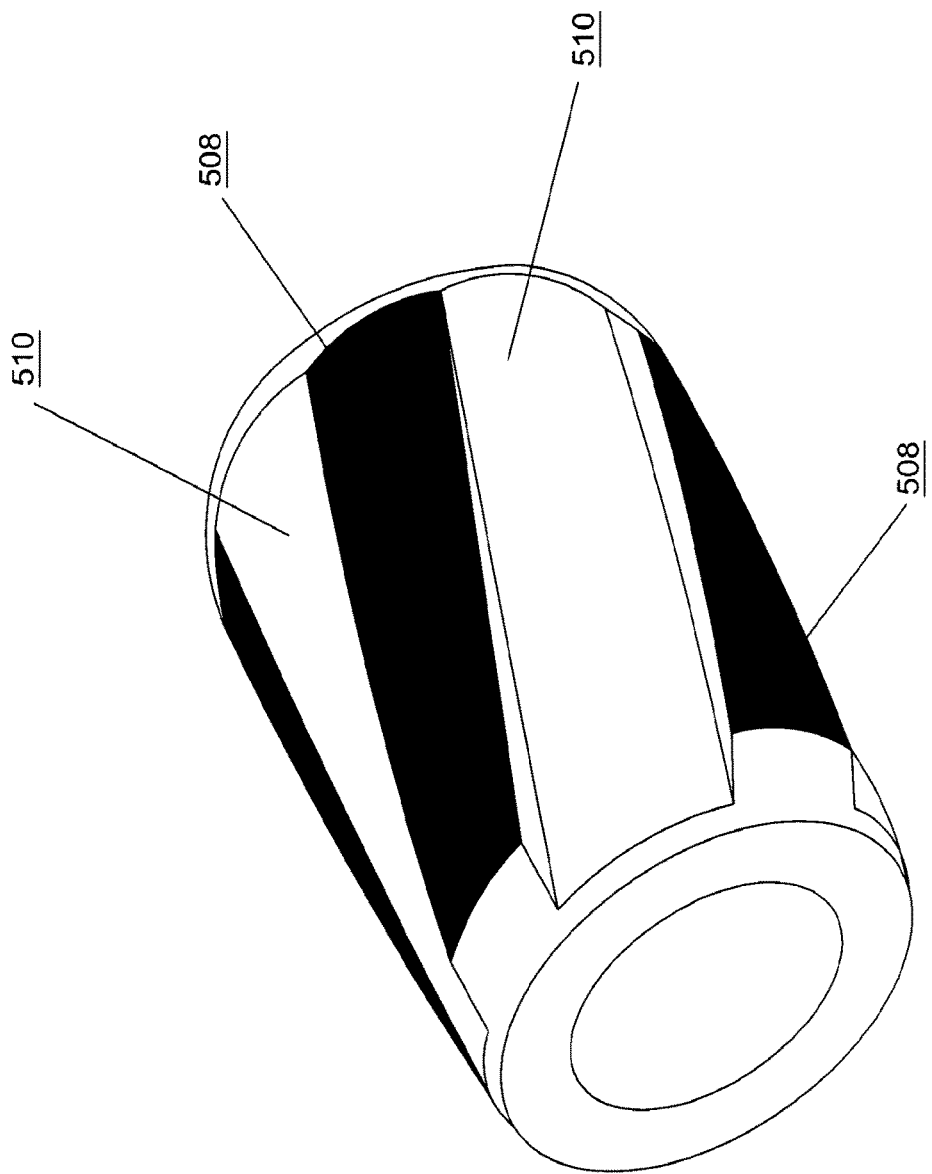

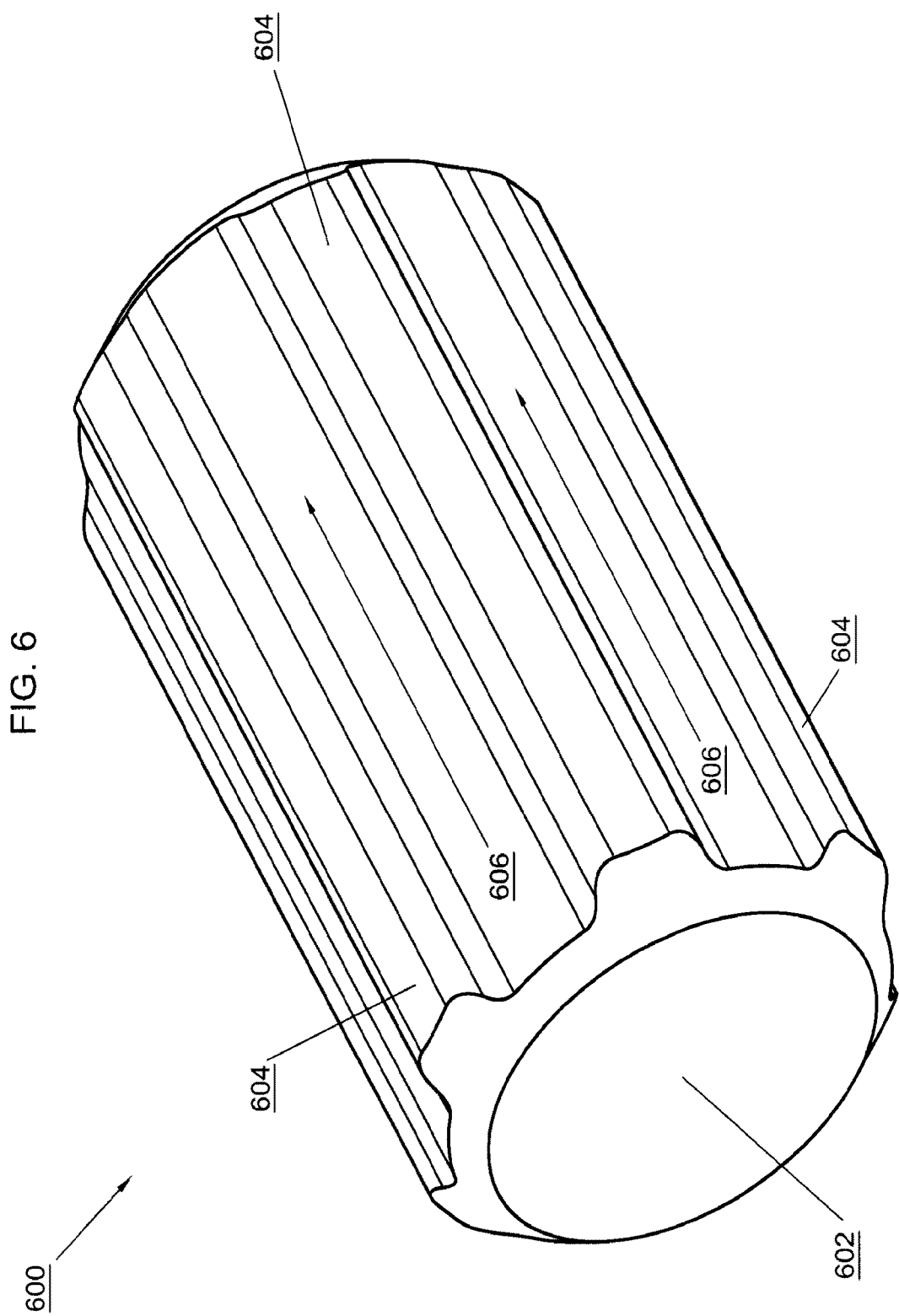

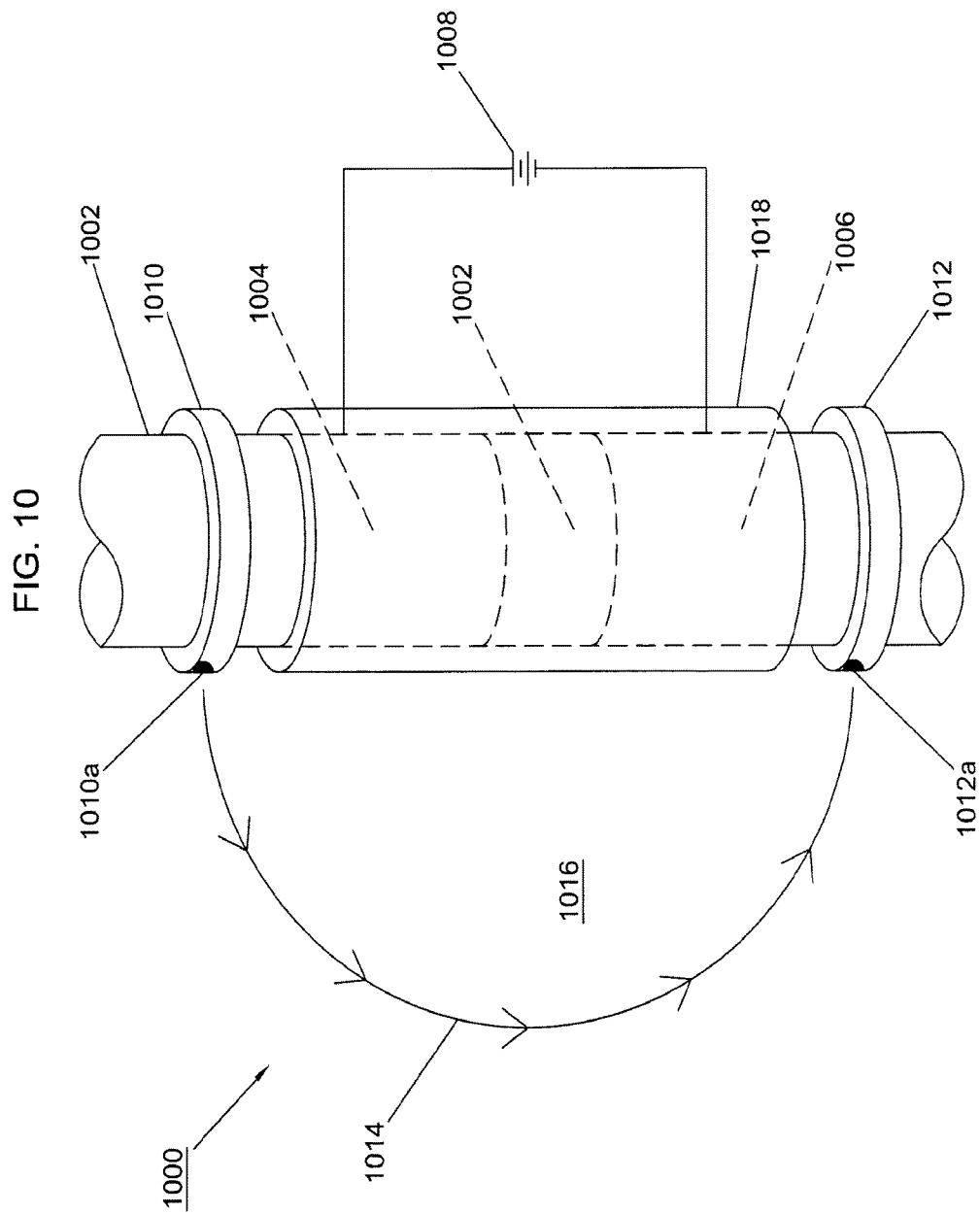

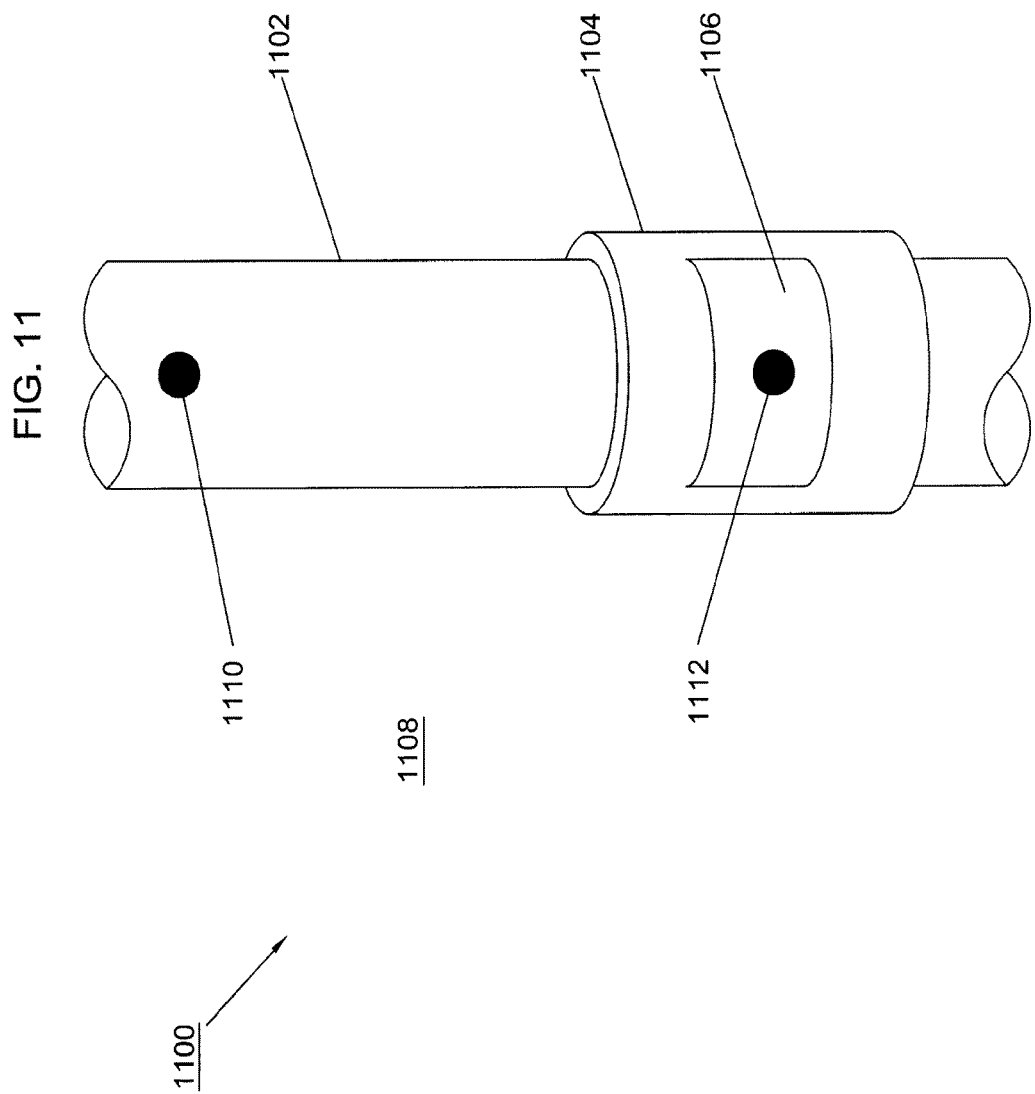

SYSTEMS AND METHODS FOR DOWNHOLE BHA INSULATION IN MAGNETIC RANGING APPLICATIONS

BACKGROUND

The present disclosure relates generally to drilling operations and more particularly to ranging systems and methods used during drilling operations.

In directional drilling operations, it may be desirable to monitor the direction of the bottom hole assembly (BHA) as it drills through a formation and/or the locations of objects, structures, and/or other formation attributes known in the art. This is particularly true in the drilling of ultra deep wellbores, offshore drilling operations, and/or a variety of other drilling operations known in the art. Conventionally, ranging systems have been provided that utilize ranging devices on a wireline. In one conventional ranging method, drilling operations are stopped, the wireline is introduced to the wellbore being drilled, the ranging devices are activated, the wireline is removed from the wellbore, and drilling operations are then restarted. Such conventional methods are time consuming, as they require the drilling operations to be stopped each time ranging operations are required. In another example, the wireline may be positioned in a first wellbore and the ranging devices used to guide the BHA in the drilling of a second wellbore. However, in many situations such as, for example, ultra deep drilling operations, it may not be practical to drill the first wellbore for the wireline. In other situations, the first wellbore may not be accessible to the wireline.

Therefore, what is needed is an improved ranging system and method for drilling operations.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIGS. 1a and 1b are perspective views illustrating embodiments of the propagation of an electromagnetic signal though a formation.

FIG. 3a is a graphic illustrating an embodiment of a drill string or BHA profile.

FIG. 3b is a side view illustrating an embodiment of a ranging system on a BHA designed using the drill string or BHA profile of FIG. 3a.

FIG. 4b is a table illustrating an embodiment of data used to design the BHA of FIG. 4a.

FIG. 5b is a side view illustrating an embodiment of a serrated section on the ranging device contact member of FIG. 5a.

FIG. 5c is a perspective view illustrating an embodiment of a the ranging device contact member of FIGS. 5a and 5b without the serrated sections.

FIG. 6 is a perspective view illustrating an embodiment of an insulator member

FIG. 10 is a perspective view illustrating a drill string includes a drill string having an insulator member in the form of an elongated non-conducting sleeve to insulate conductive structures protruding from the drill string.

FIG. 11 is a perspective view illustrating an embodiment of a drill string including a conductive window surrounded by an insulator sleeve member to isolate the conductive window member from a conductive collar member.

DETAILED DESCRIPTION

Figure 2A:
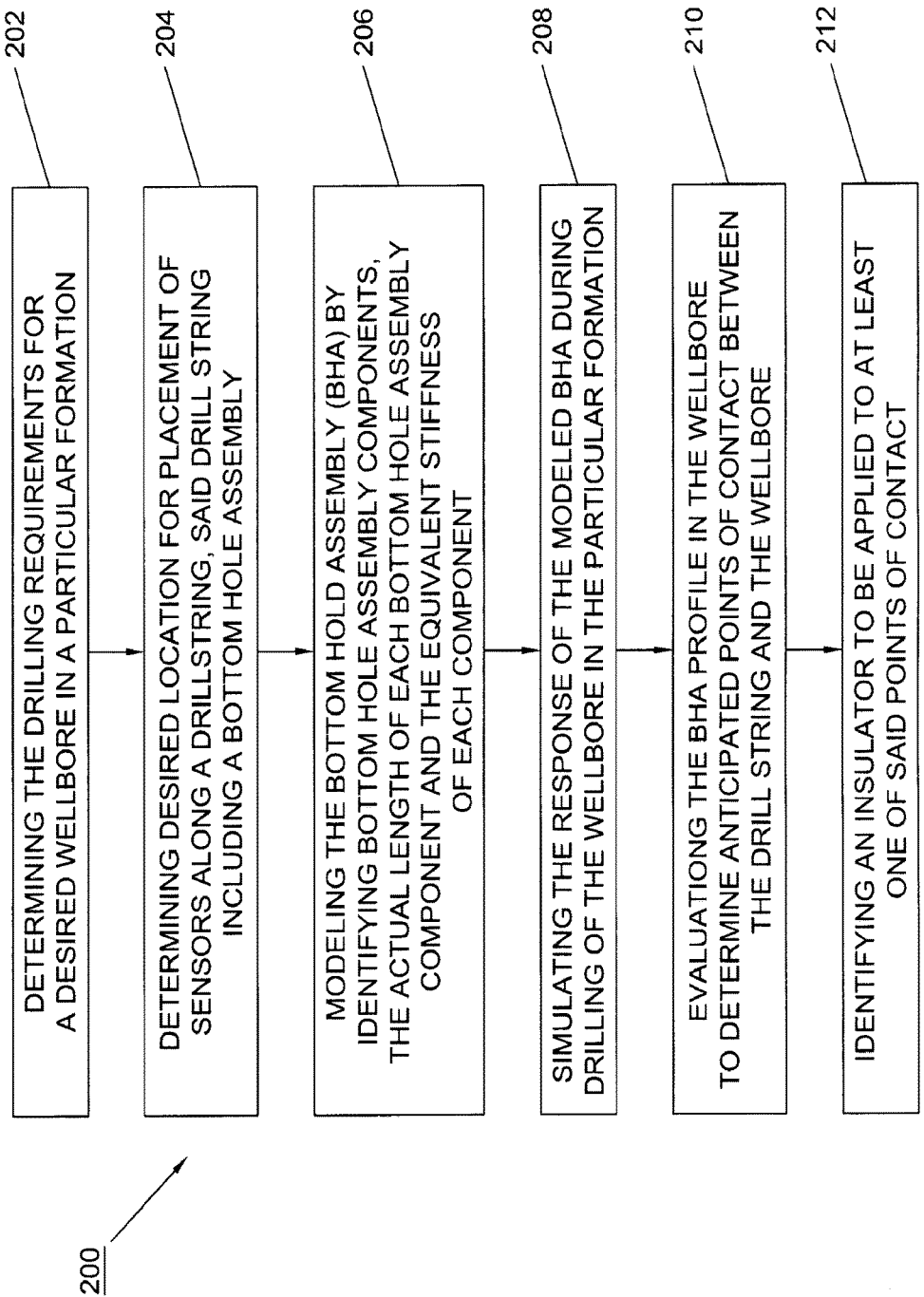
FIG. 2a is a flow chart illustrating an embodiment of a method for providing a ranging system on a drill string or bottom hole assembly (BHA).

The ranging system of the present disclosure seeks to replace conventional wireline systems and methods with a ranging system that is included on a drill string or Bottom Hole Assembly (BHA) such that ranging operations may be performed during drilling, rather than requiring drilling interruptions or the need for a second wellbore.

In an embodiment of the present disclosure, a ranging system is disclosed that forms part of the bottom hole assembly (BHA) of a drill string. During drilling operations, the ranging system utilizes ranging devices that may include a transmitter and/or a receiver or both that propagate an electromagnetic signal between each other through a formation. In order to propagate the electromagnetic signal through the formation, conductive contacts must be established between a ranging device and the formation. Among other things, each ranging device is operable to control the depth of investigation by, for example, controlling the strength of the electromagnetic signal, the directionality of the signal, and a variety of other signal properties known in the art. In an embodiment, the direction of the signal and its strength may be controlled by the positioning an antenna in relation to a ground. The spacing of multiple ranging devices and their respective formation contact points along the drill string may be specifically selected to achieve other operational parameters as well. In other words, the conductive contact points can effect the outcome of the magnetic ranging operations.

FIGS. 1a and 1b illustrate a ranging system 100 associated with a drill string 102 positioned in a formation 104. The drill string 102 includes a ranging device that include a collar 106 having a transmitting contact point 106a and a collar 108 having a receiving contact point 108a. The collar 106 and the collar 108 may include a conducting material such as, for example, metal. The collars 106 and 108 are separated by an insulating collar 110, and are each connected to a power supply 110. FIGS. 1a and 1b depict the propagation of an electromagnetic signal 114 through the formation 104 between the transmitting contact point 106a and the receiving contact point 108a when there is conducting contact between the collars 106 and the formation 104, conducting contact between the collar 108 and the formation 104, and when power is supplied to the collars 106 and 108. Those skilled in the art will appreciate that while a contact point 106 or 108 may be described as a point for transmitting or receiving, a contact point may be used to receive an electromagnetic signal or transmit an electromagnetic signal or both, depending on the particular ranging device employed.

In FIG. 1a, the transmitting contact point 106a and the receiving contact point 108a are spaced apart such that the electromagnetic current path there between penetrates relatively deep into the formation 104. In contrast, in FIG. 1b, the transmitting contact point 106a and the receiving contact point 108a are much closer together such that the electromagnetic current path penetration into the formation 104 is relatively shallow (e.g., compared to that resulting from the transmitting contact point 106a and the receiving contact point 108a in FIG. 1a.) Thus, the spacing of the transmitting contact point 106 and the receiving contact point 108 may be selected to control the parameters of the ranging operation to be conducted. However, those skilled in the art will understand that in performing drilling operations such as, for example, offshore drilling operations or ultra deep drilling operations, it has been found that, as the length of the drill string used to drill the wellbore increases, drill string 'sag' and the effects of harmonic response in the drill string are significantly enhanced, all of which can result in unwanted contact between the drill string and the formation at a location that is between the ranging device components and that can prevent ranging devices from accurately performing ranging operations. In other words, as the length of the drill string 102 increases, it becomes more difficult to control contact between the drill string and the formation at locations between the transmitting contact point 106a and the receiving contact point 108a of a ranging device. Those skilled in the art will appreciate that these intermediate contact points between the transmitting and receiving contact points can impact the current path of the electromagnetic signal 114, and hence, the effectiveness of the ranging operations. For purposes of the description, the term "ranging device" includes any device utilizing contact with the formation to propagate an electromagnetic signal into the formation for ranging purposes. Such ranging devices may include magnetic ranging sensors and/or a variety of other ranging equipment know in the art.

To better control unwanted contact between the drill string and the formation, in one aspect of the present disclosure, insulator members (see insulator members 316 in FIG. 3b) are positioned along the drill string 102. The positioning of insulator members are preferably selected based on a modeling and simulation method that is performed on the drill string 102 and that can be used to project the expected contact points of the drill string with the formation 104 over a range of variables. These insulator members isolate portions of the drill string 102 from contact with the formation 104, thereby controlling conducting contact between the drill string 102 and the formation 104 such that accurate ranging operations may be conducted using the ranging devices. In other words, the insulator members prevent a conductive path from forming between the drill string 102 and the formation 104 except at the predetermined points on the drill string 102 selected for the ranging devices, as it has been found that unintended contacts of the drill string 102 and the formation 104 between the ranging devices 106 and 108 will "short out" the ranging system or otherwise interfere with the ability of the ranging devices to most effectively receive and transmit electromagnetic signals.

Thus, in one embodiment of the present disclosure, illustrated in FIG. 2a, a method 200 for providing a ranging system for a drill string is provided. The method 200 begins at block 202 where the drilling requirements for a desired wellbore in a particular formation are determined. Drilling requirements may include formation characteristics, formation depth, formation make-up, formation temperatures, formation pressures, and/or a variety of other drilling requirements known in the art. In an embodiment, a determination of drilling requirements includes at least one of the following: assessing the desired wellbore depth, the desired wellbore direction, the desired wellbore inclination, the desired wellbore diameter, and/or a variety of other wellbore parameters known in the art.

The method 200 then proceeds to block 204 where the desired locations along a drill string for positioning of ranging devices is determined. In an embodiment, the desired locations includes the locations of ranging devices as part of the BHA. In an embodiment, the determination of the desired locations at block 204 includes a determination of the spacing requirements along the drill string for the ranging devices, such as, for example, antennas and receivers, for a desired propagation path of a ranging electromagnetic signal. In an embodiment, determining desired locations includes identifying desired contact points between ranging devices and the sides of a wellbore.

The method 200 then proceeds to block 206 where the drill string or BHA components needed for a particular drilling operation are identified and modeled. In an embodiment, various parameters of the drill string or BHA components are selected such as, for example, the length of each component, the equivalent stiffness of each component, and/or a variety of other component parameters known in the art.

The method 200 then proceeds to block 208 where the response of the modeled drill string or BHA during drilling operations is simulated and a drill string or BHA profile is generated. At block 208, the simulation is carried out over a range of parameters such as, for example, rotational speed, weight on the drill bit, inclination of the wellbore, shear force, moment, slope, deflection, side force, and/or a variety of other parameters known in the art. In an embodiment, the simulation at block 208 may also include the formation characteristics determined at block 202 of the method 200. In an embodiment, a drill string or BHA profile 300, illustrated in FIG. 3a, is generated. As discussed in further detail below, the drill string or BHA profile 300 indicates the anticipated points of contact between the drill string and the walls of the wellbore being drilled into the formation. In an embodiment, simulating a response includes simulating a response of the BHA to at least one of the following: anticipated environment, directionality, inclination, weight on bit, and/or a variety of other BHA responses known in the art.

The method 200 then proceeds to block 210 where the drill string or BHA profile is evaluated to determine the anticipated points of contact between the drill string and the formation (e.g., the anticipated points of contact between the drill string and the walls of a wellbore being drilled into the formation.) In an embodiment, evaluating the drill string or BHA Profile includes evaluating at least one of the following: anticipate slope, anticipated deflection shear forces, or anticipated bending moments on the drill string or BHA The method 200 then proceeds to block 212 where at least one insulator member is selected and applied to a drill string or BHA at the anticipated points of contact determined at block 210 where it is desired to insulate the drill string or BHA from the formation. In an embodiment, identifying an insulator member includes determining at least one of the following: size of the insulator, shape of the insulator, function of the BHA components, and/or a variety of other insulator member parameters known in the art. In an embodiment, the method further includes applying an insulator member to the drill string based on the determined points of contact. In an embodiment, the method further includes applying an insulator member to the drill string at each determined points of contact. In an embodiment, the applying an insulator member includes molding insulating material on at least a portion the perimeter of a drill string. In an embodiment, the applying an insulator member includes attaching a prefabricated centralizer formed of insulating material to the drill string.

Figure 4A:
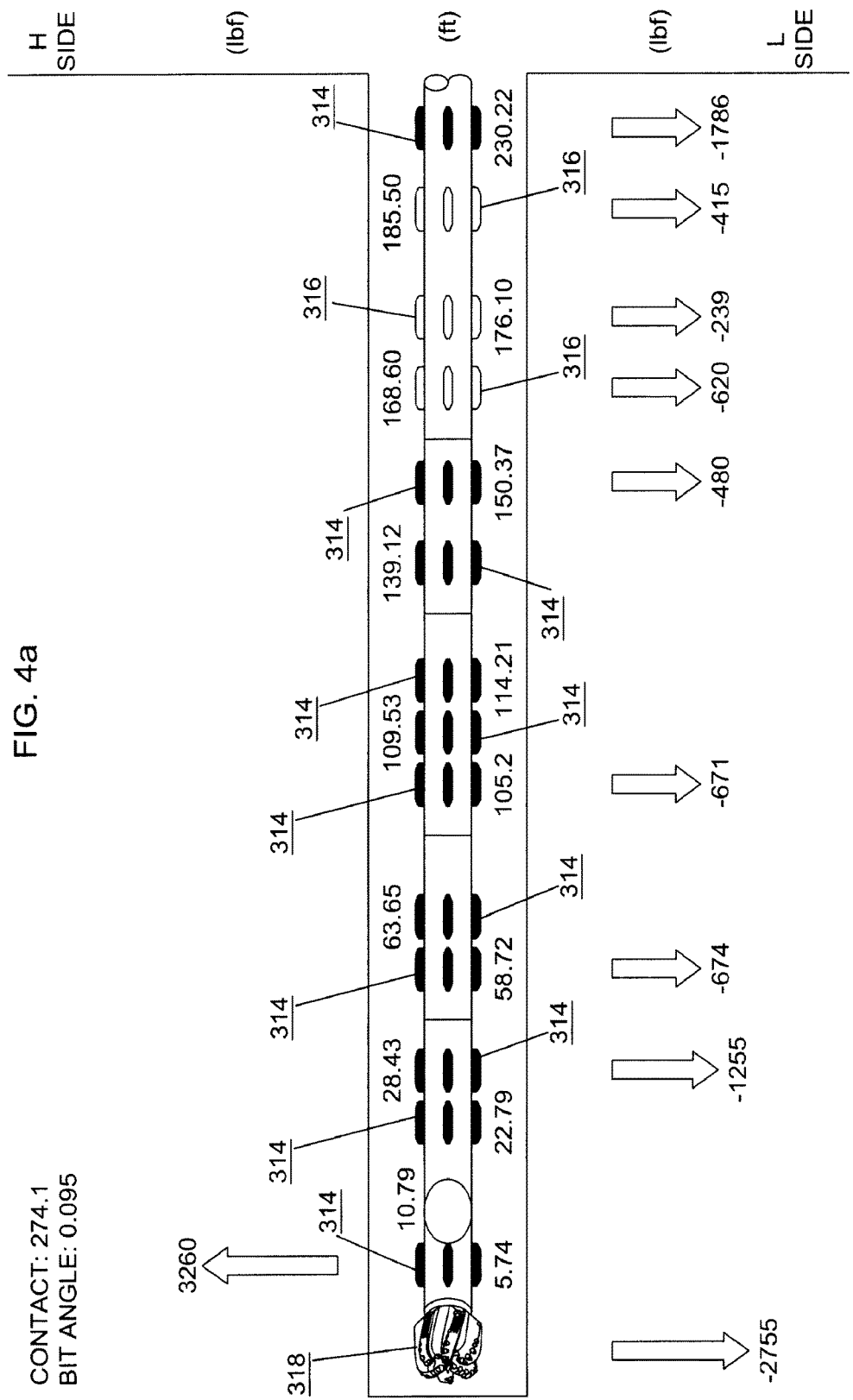
FIG. 4a is a side view illustrating an embodiment of a ranging system on a BHA.
Figure 4C:
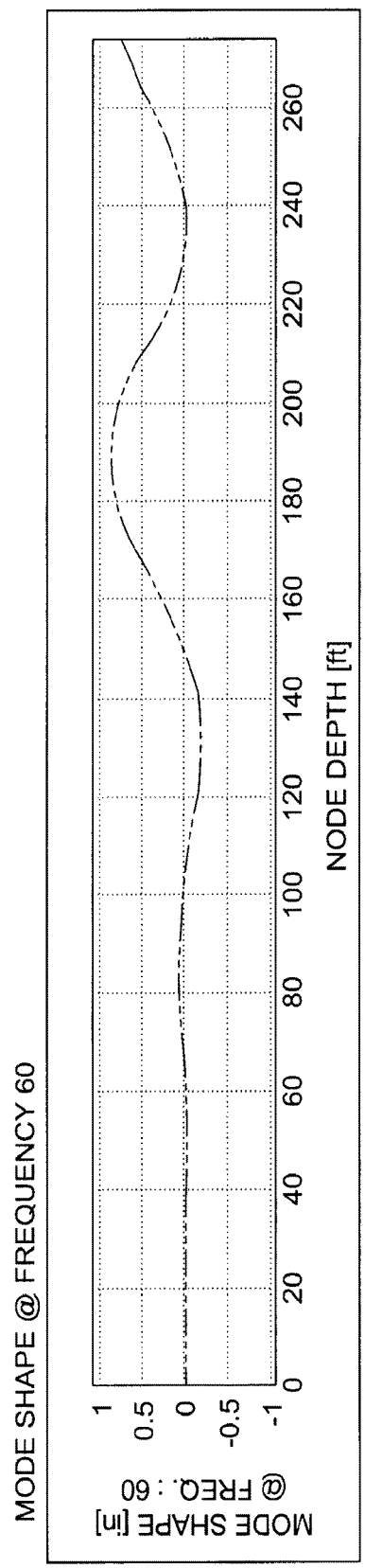
FIG. 4c is graphic illustrating an embodiment of a "mode shape" of the BHA of FIG. 4a at 60 RPM.

In another embodiment, a harmonic response of the drill string or BHA may be determined. FIG. 4c illustrates a mode shape of the drill string illustrated in FIG. 4a (modeled to produce the data illustrated in FIG. 4b) operating at a frequency of 60 RPM. Determination of the harmonic response may result in the identification of additional anticipated points of contact between the drill string or BHA and the formation where insulator members may need to be applied. Specifically, once a model or physical drill string or BHA has been constructed and the locations of the insulator members necessary to achieve the electromagnetic ranging requirements of the system have been determined, the harmonic frequency response of the system may be evaluated in the same way as the initial evaluation. In an embodiment, evaluating harmonic frequencies includes determining additional anticipated points of contact between the drill string and the wellbore based on the anticipated harmonic response of the BHA in the wellbore during drilling. In an embodiment, the method further includes applying an insulator member to the drill string based on the determined points of contact arising from anticipated harmonic response determination. In an embodiment, the step of evaluating harmonic frequencies further comprises evaluating harmonic frequencies over a range of drill bit speeds.

Referring to FIG. 3a, a drill string or BHA profile 300 generated using the method described above is illustrated. The horizontal lines 302a and 302b represent the walls of the wellbore being drilled. The elongated shaded shape 304 represents the drill sting or BHA including an inside diameter 304a and an outside diameter 304b. The dashed lines 306 represent the desired ranging device locations, i.e., the intended "conducting" contact points between the ranging devices on the drill string and the walls of the wellbore. The dotted lines 308 represent the expected points of contact between the drill string or BHA and the walls of the wellbore, i.e., where it is projected the drill string or BHA will "short out" or "ground out" the ranging devices when ranging operations are performed.

In an embodiment, the expected points of contact (such as is represented by the dotted lines 308 of FIG. 3a) between the drill string or BHA and the walls of the wellbore is where insulator members should be preferably coupled to (e.g., molded onto) the drill string. Using the drill string or BHA profile, a drill string or BHA may be constructed that, during operation, will only contact the formation at the end of the drill string (the bit in contact with the formation) and at the desired points of conductive contact for the ranging devices (against the wall of the wellbore.)

In one embodiment, the step of modeling 206 may be performed a second time or in iterative fashion once an expected point of contact is identified by including in the step a modeled insulator. Likewise, the step of simulating 208 may be formed a second time or in iterative fashion once an expected point of contact is identified by including in the step an insulator, thereby permitting simulation of the drill string or BHA with insulators in place. In this way, the placement of insulators may be further optimized with respect to the location of the ranging devices.

Those skilled in the art will appreciate that the foregoing modeling and simulation of at least steps 206 and 208 described above must be performed with a computer system. In one embodiment, the computer system includes at least one processor, storage, one or more I/O devices, and a display interconnected via a system bus. Software instructions executable by the processor for implementing a modeling and simulation system in accordance with the embodiments described herein, may be stored in storage. It will be recognized that the computer system may be connected to one or more public and/or private networks via appropriate network connections. It will also be recognized that the software instructions comprising the modeling and simulation system may be loaded into storage from a CD-ROM or other appropriate storage media. Thus, at least a portion of the steps of the method illustrated in FIG. 2a are performed utilizing a computer system. The display, such as a monitor or a printer, may be used to generate an image such as is illustrated in FIGS. 3a, 3b, 4a and 4c, as well as data, such as is illustrated in FIG. 4d to permit fabrication of a system consistent with the modeling performed herein.

Figure 3B:
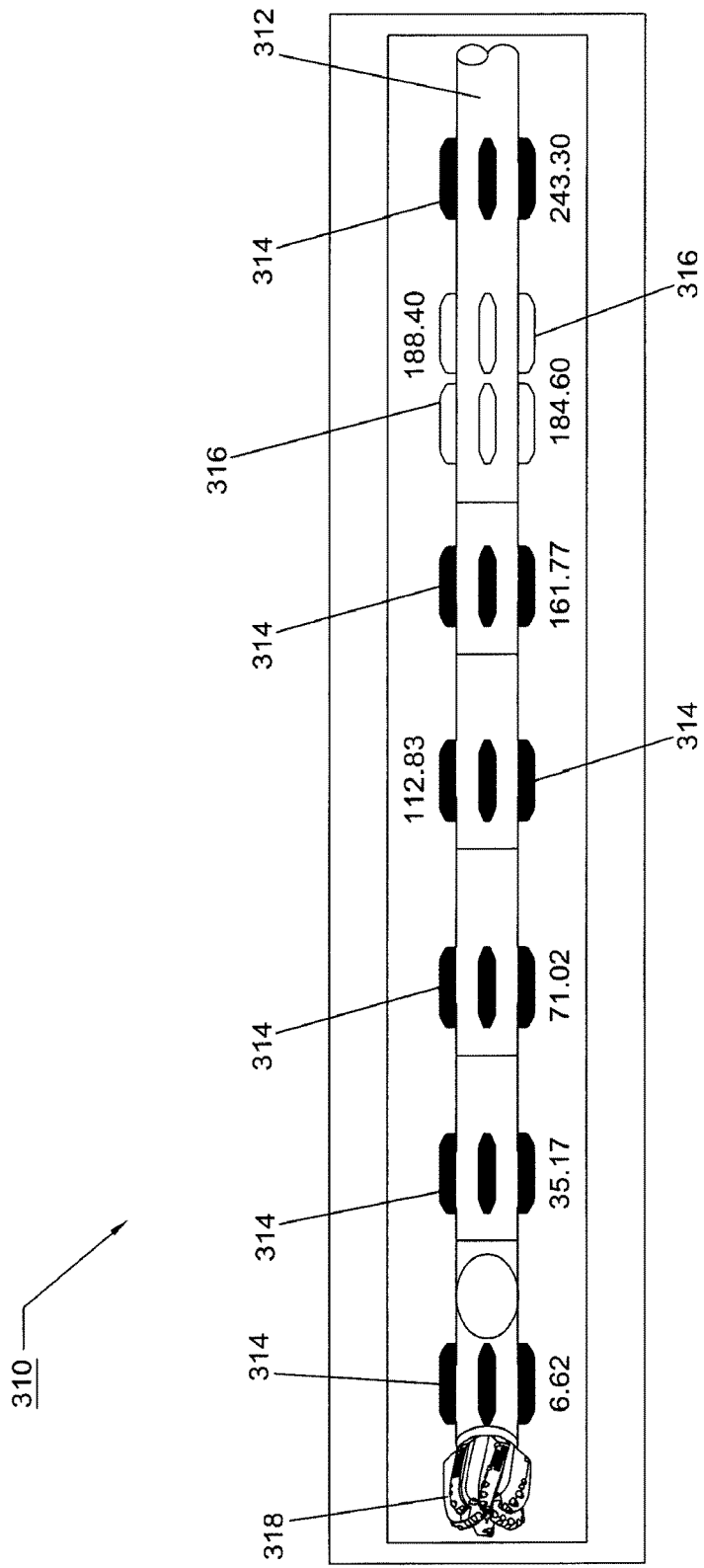

FIG. 3b illustrates a BHA 310, including a ranging system, that is constructed using the BHA profile 300 of FIG. 3a. The BHA 310 includes a string 312 having a plurality of ranging devices 314, positioned as desired and indicated in the BHA profile 300 of FIG. 3a. As described above, the ranging devices 314 are operable to provide conducting contacts with the formation. The ranging devices 314 may include protrusions, sleeves, collars, stabilizers, centralizers, wear bands, sensors, and/or a variety of other ranging device components known in the art. In an embodiment, the ranging devices 314 are positioned on the string according to the dashed lines 306 on the BHA profile 300 of FIG. 3a. For purposes of the description, the ranging devices 314 may include any structure capable of establish an electromagnetic conduction path between the drill string and the wall of the wellbore being drilled into the formation. Further, while such structures may be coupled to the drill string, they may also be an integral part of the drill string. In one embodiment, the conducting contact of the ranging devices 314 may simply be a contact point between the drill string itself and the formation such as, for example, a connection joint on the drill string.

A plurality of insulator members 316 are included on the string 312 between ranging devices 314. In an embodiment, the insulator members 316 are provided at locations on the string where the modeling indicates there will be contact between the drill string and the wall of the wellbore due to, for example, drill string sag, drill string bending as a result of force from the weight on the bit 318, and/or the harmonics of the string 312 itself (e.g., as the string 312 is rotated, it experiences critical frequencies that cause the string to deform and takes on the shape of the wave, as illustrated in FIG. 3a.) In an embodiment, the insulator members 316 are positioned on the string 302 according to the dotted lines 308 on the BHA profile 300 of FIG. 3a.

One of skill in the art will recognize that many drilling situations are unique and may require specific BHAs, wellbores, formations, directionality, drill speeds, etc, such that the modeling methods discussed above will be performed before each drilling operation in order to determine where on the drill string to install the insulator members.

Figure 5A:
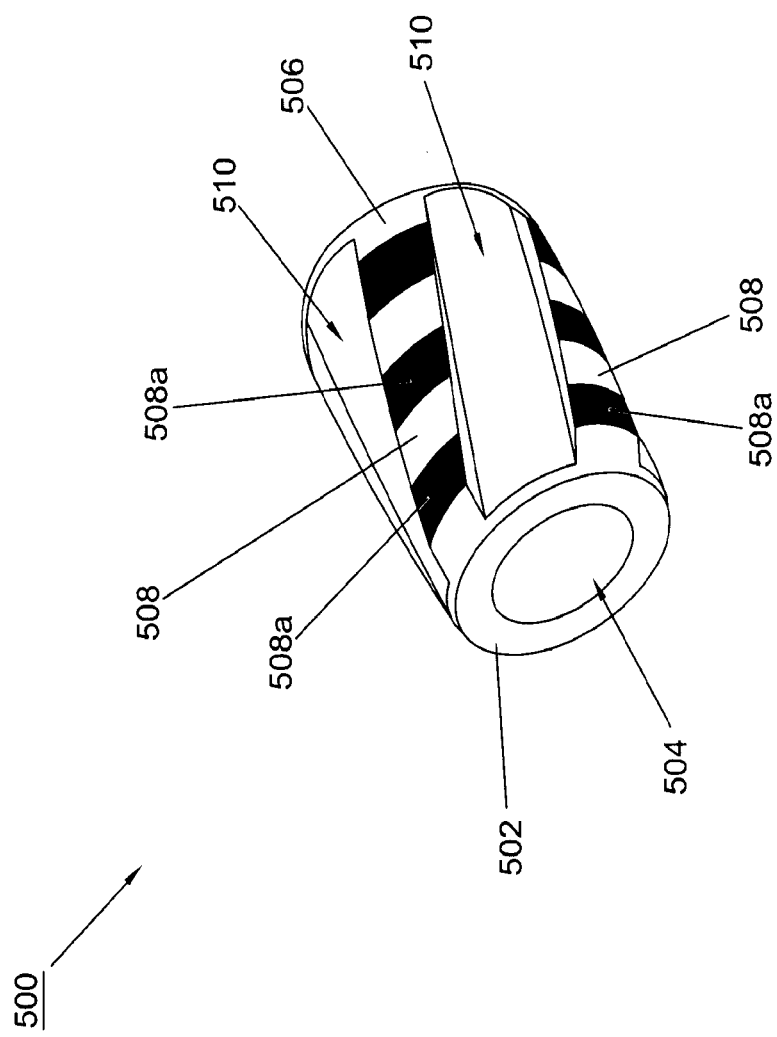
FIG. 5a is a perspective view illustrating an embodiment of a ranging device contact member.
Figure 5B:
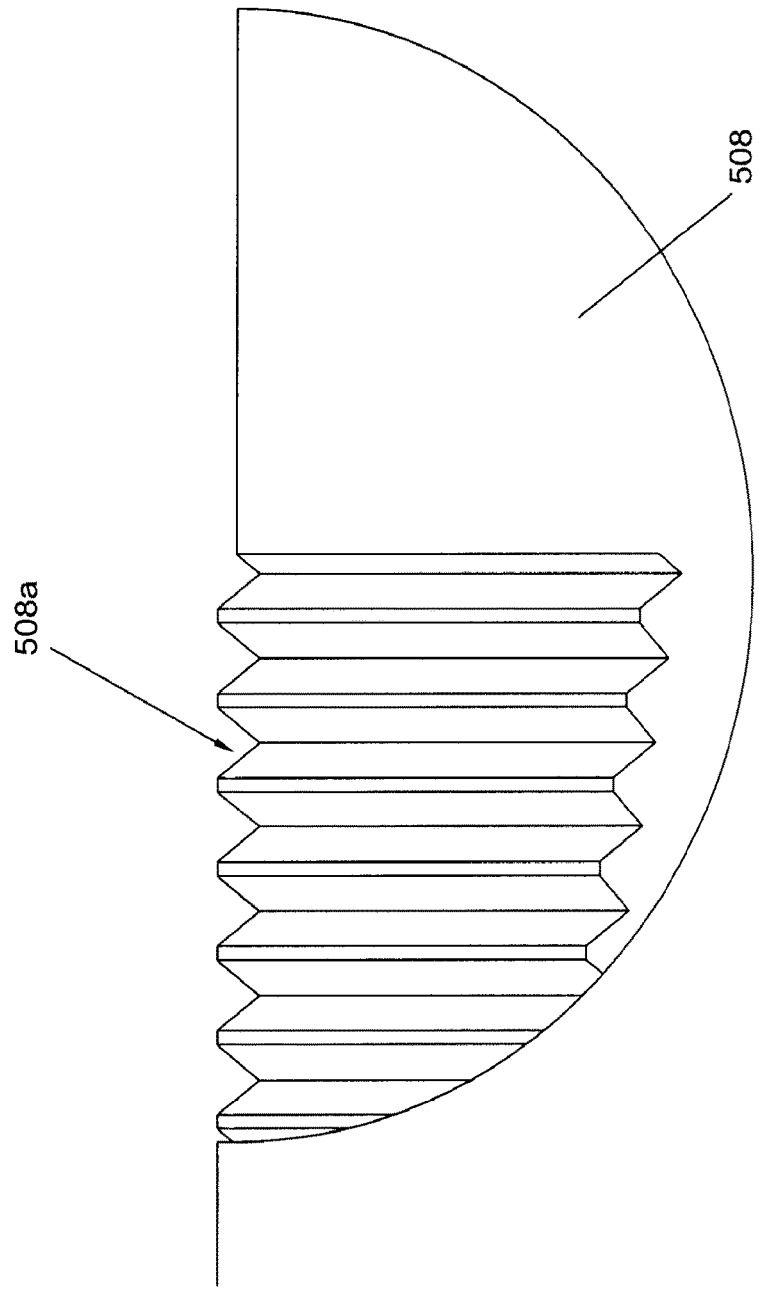

Referring now to FIGS. 5a and 5b, one embodiment of a contact member 500 for a ranging device is illustrated. A contact member 500 may be used to enhance coupling between a ranging device and the formation. The illustrated contact member 500 includes a cylindrical base 502 that defines a cylindrical passageway 504 extending through the cylindrical base 502 and an outer surface 506 located opposite the cylindrical base 502 from the cylindrical channel 504. A plurality of contact features 508 extend from the outer surface 506 of the cylindrical base 502 in a spaced apart orientation from each other such that a plurality of channels 510 are defined between each pair of contact members 508. In an embodiment, each of the contact features 508 includes a plurality of spaced apart serrated sections 508a. In an embodiment, other portions of the contact features 508 may be serrated such as, for example, the edges of the contact features 508 adjacent the channels 510. In operation, the channels 510 allow, for example, mud, formation fluid, and/or other wellbore fluids to migrate past the ranging devices, while the serrated sections 508a of the contact features 508 provide electrical contact with the wall of the wellbore. While one possible shape/configuration of a ranging device contact member 500 is illustrated in FIGS. 5a and 5b, it is meant to be merely exemplary, and one of skill in the art will recognize that a variety of other shapes/configurations will fall within the scope of the present disclosure. For example, in place of the scalloped ring-type contact features 508 illustrated in FIG. 5a, continuous circular ring-type contact features 508 that are not scalloped may be provided. In another embodiment, individually molded spiral blade contact features 508 may be provided, as illustrated in FIG. 5c. The embodiment of FIG. 5c may be modified to provide individually molded straight blade contact features 508. Likewise, contact member 500 comprise spaced apart blades or projections as illustrated in FIG. 3b. Furthermore, any combination of the embodiments disclosed may be used to provide the ranging device contact members 500.

Referring now to FIG. 6. an insulator member 600 is illustrated. The insulator member 600 preferably includes a cylindrical base 602 having an outer surface with a plurality of contact members 604 that extend from the outer surface of the cylindrical base 602 in a spaced apart orientation from each other, thereby defining a plurality of channels 606 between each pair of contact members 604. In operation, the channels 606 allow, for example, mud, formation fluid, and/or other wellbore fluids to migrate along the wellbore past the insulator member 600. While one possible shape/configuration of an insulator member is illustrated in FIG. 6, it is meant to be merely exemplary, and one of skill in the art will recognize that a variety of other shapes and or configurations will fall within the scope of the present disclosure. For example, in place of the straight blade-type contact members 604 illustrated in FIG. 6, scalloped ring-type contact members (similar to the contact features 508 illustrated in FIG. 5a) may be provided, continuous circular ring-type contact members that are not scalloped may be provided, individually molded spiral blade contact members (similar to the contact features 508 illustrated in FIG. 5c) may be provided, individually molded straight blade contact members, and/or any combination of the embodiments disclosed may be used to provide the insulating member 600.

In an embodiment, insulator members may be formed from a variety of materials such as, for example, epoxy, epoxy with strength enhancing additives (e.g., fiber) ceramics, fiberglass composites, plastics, Kevlar®, Polyether ether ketone (PEEK) with abrasive resistant additives, and/or a variety of other materials known in the art. In an embodiment, the insulator members are formed from a carbon-fiber epoxy molded onto the drill string at the expected points of contact identified during the modeling method. Those skilled in the art will appreciate that any non-conducting material may be suitable to form the insulator members. Moreover, while the insulator members have been described as being molded on the drill string, other forms of attachment are contemplated. Likewise, the shape of the insulator members may be selected as desired for a particular application. In one example, the insulator members may be elongated to coat a portion of the drill string. In another example, the insulator members may have a basic donut shape with a hemispherical radial cross-sectional shape, may be shaped as orbs, may be shaped as radially extending blades, and/or may be shaped using a variety of shapes known in the art. In an embodiment, insulator members may include one or more stabilizer blades (e.g., as illustrated in FIGS. 3b and 4a.)

Figure 7:
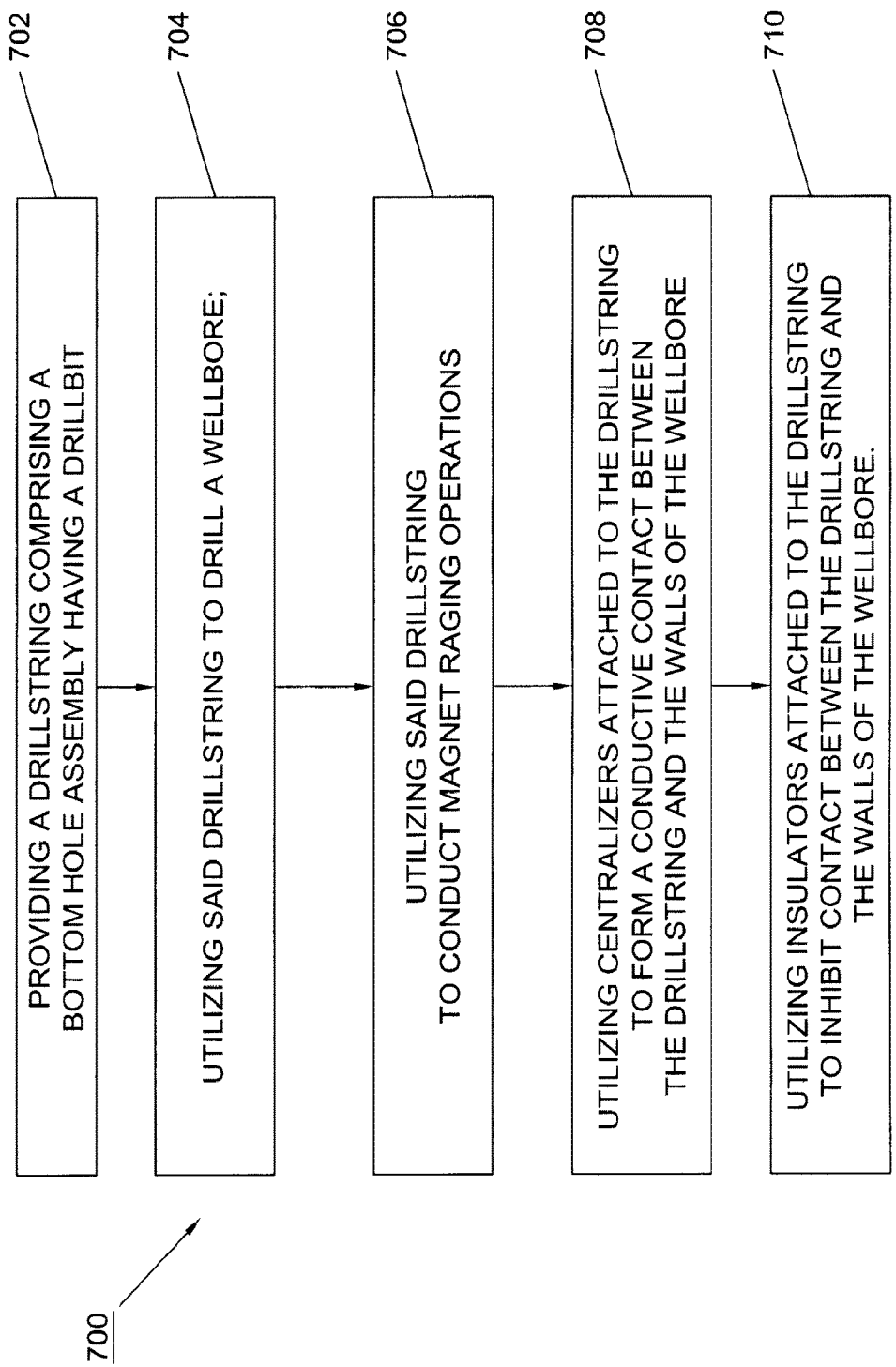
FIG. 7 is a flow chart illustrating an embodiment of a method for performing ranging operations.

Referring now to FIG. 7, a method 700 is illustrated for conducting ranging operation using a drill string. In an embodiment, the ranging operations may be conducted while the drill string is performing drilling operations. The method 700 begins at block 702 where a drill string including a BHA having a drill bit is provided. The drill string is provided with one or more ranging devices and one or more insulator members as described above. The method 700 then proceeds to block 704 where the drill string is used to drill a wellbore. The method 700 then proceeds to block 706 where the drill string is used to conduct ranging operations. The method 700 then proceeds to block 708 where, during the ranging operations, ranging devices (e.g., centralizers) that are attached to the drill string are used to form a conductive contact between the drill string and the walls of the wellbore. The conductive contact allows an electromagnetic current or signal to be propagated through the formation and used to perform the ranging operations. The method 700 then proceeds to block 710 where, during the ranging operations, the insulator members that are attached to the drill string are used to inhibit contact between the drill string and the walls of the wellbore. The inhibition of contact between the drill string and the walls of the well bore, along with the conductive contact between the ranging devices and the walls of the wellbore, allow for accurate ranging operations to be conducted, as discussed above.

A plurality of drill string or BHA ranging systems will now be described that include the ranging devices and insulator members and that may be used to perform the method 700 discussed above. However, the systems discussed below are meant to be merely exemplary, and one of skill in the art will recognize that a variety of configurations that are not illustrated will fall within the scope of the present disclosure.

Figure 8:
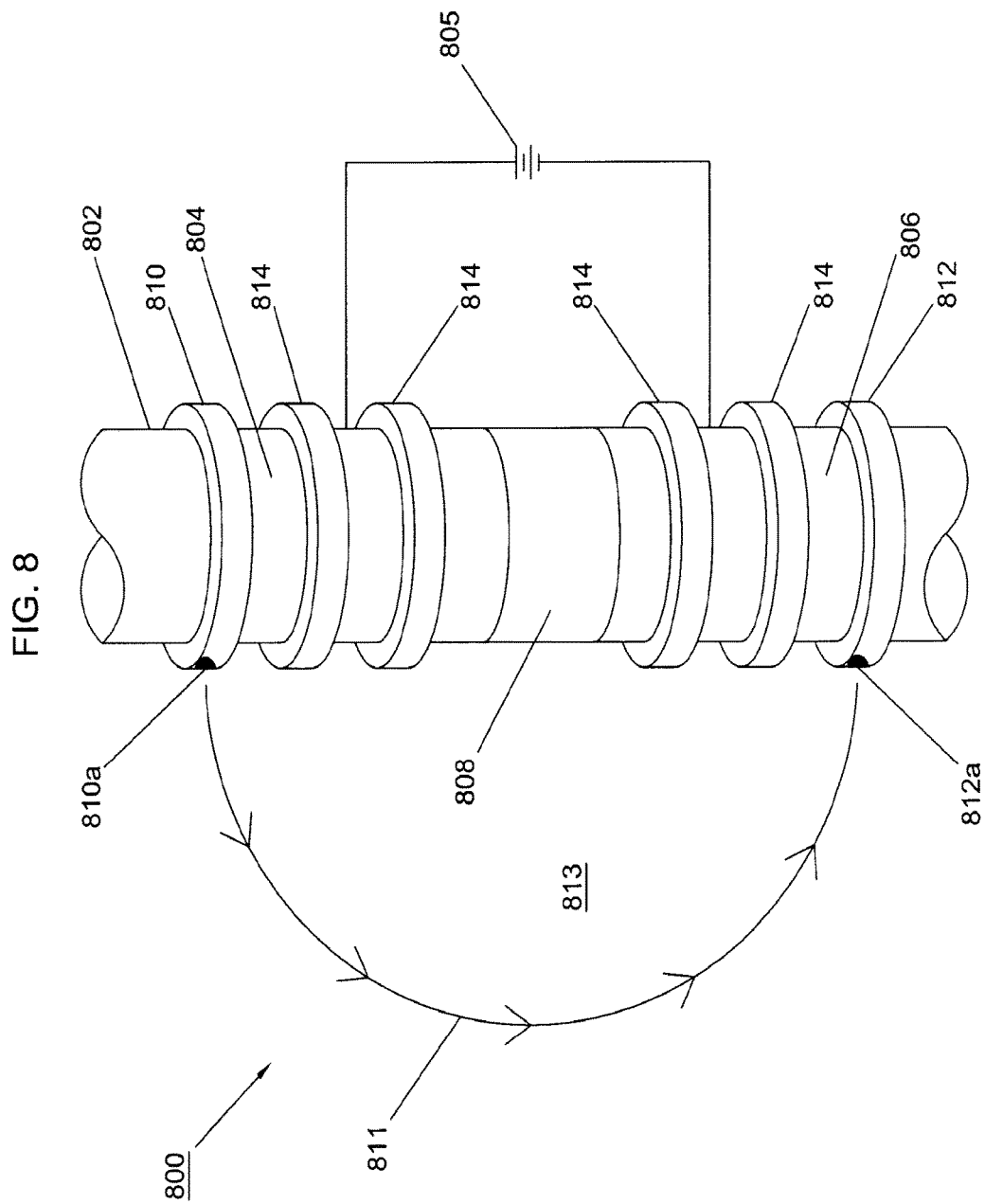
FIG. 8 is a perspective view illustrating a portion of a drill string with a plurality of ranging devices positioned on that drill string, separated or "isolated" by a plurality of insulator members, and propagating an electromagnetic signal into a formation.

Referring now to FIG. 8, a ranging system 800 that may be operated according to the method 700, discussed above with reference to FIG. 7, is illustrated. As discussed above, the ranging system 800 may be included on a drill string, BHA, and/or other drilling device known in the art. The ranging system 800 includes a string 802 having a ranging device collar 804 and a ranging device collar 806 separated by an insulating collar 808. The ranging device collars 804 and 806 are each coupled to a power source 805. Power source 805 may be locally carried on the drill string or provided at the surface. In an embodiment, the ranging device collars 804 and 806 may include a conductive material such as, for example, a metal. A ranging device contact member 810 is coupled to the ranging device collar 804 and a ranging device contact member 812 is coupled to the ranging device collar 806. In an embodiment, the ranging device contact members 810 and 810 are positioned on the string 802 according to the method 200, discussed above. As such, the ranging device contact members 810 and 812 may be spaced apart on the string 802 to provide a predetermined positioning and depth of a formation current 811 into the formation 813. A plurality of insulator members 814 are coupled to the string 802. In an embodiment, the insulator members 814 are the insulator members positioned on the drill string according to the method 200, discussed above. During ranging operations, the ranging device contact members 810 and 810 conductively contact the formation 813 (e.g., the wall of a wellbore being drilled) at contact points 810a and 812a, while the insulator members 814 may contact the formation 813 (e.g., the wall of a wellbore being drilled) at expected contact points determined during the method 200 to provide a nonconductive contact that ensures that the formation current 811 is not "shorted out" by contact between the string 802 and the formation 813.

Figure 9:
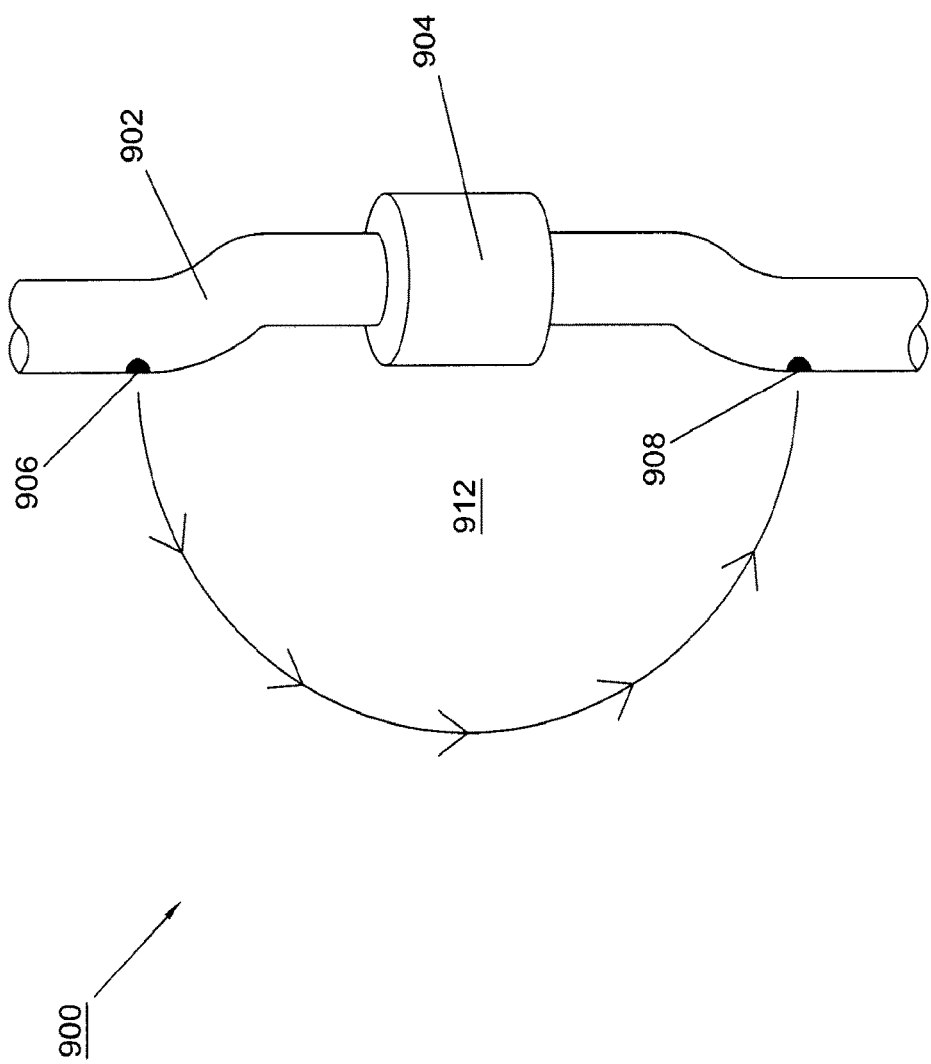
FIG. 9 is a perspective view illustrating a drill string including an insulator member, in the form of a non-conducting sleeve, located on the drill string and allowing the propagating an electromagnetic signal into a formation to accurately perform ranging operations.

Referring now to FIG. 9, a ranging system 900 that may be operated according to the method 700, discussed above with reference to FIG. 7, is illustrated. As discussed above, the ranging system 900 may be included on a drill string, BHA, and/or other drilling device known in the art. The ranging system 900 includes a string 902 having an insulating collar 904. A pair of ranging device contact points 906 and 908 are located on the string 902 on opposite sides of the insulating member 904. In an embodiment, the positions of the ranging device contact points 906 and 908 on the drill string are known according to the method 200, discussed above. The ranging device contact points 906 and 908 may provide a predetermined position and depth of a formation current 910 into the formation 912. The insulator member 904 is positioned on the drill string according to the method 200, discussed above. During ranging operations, the string 902 deforms (preferably substantially as predicted by the modeling and simulation of the method 200) to conductively contact the formation 912 (e.g., the wall of a wellbore being drilled) at the ranging device contact points 906 and 908, while the insulator member 904 may contact the formation 912 (e.g., the wall of a wellbore being drilled) at the expected contact point determined during the method 200 to provide a nonconductive contact that ensures that the formation current 910 is not "shorted out" by contact between the string 902 and the formation 912

Referring now to FIG. 10, a ranging system 1000 that may be operated according to the method 700, discussed above with reference to FIG. 7, is illustrated. As discussed above, the ranging system 1000 may be included on a drill string, BHA, and/or other drilling device known in the art. The ranging system 1000 includes a string 1002 having a ranging device collar 1004 and a ranging device collar 1006 separated by an insulating collar 1002. The ranging device collars 1004 and 1006 are each coupled to a power source 1008. Power source 1008 may be locally carried on the drill string or provided at the surface. In an embodiment, the ranging device collars 1004 and 1006 may include a conductive material such as, for example, a metal. A ranging device contact member 1010 is coupled to the ranging device collar 1004 and a ranging device contact member 1012 is coupled to the ranging device collar 1006. In an embodiment, the ranging device contact members 1010 and 1012 are positioned on the string according to the method 200, discussed above. As such, the ranging device contact members 1010 and 1012 may be spaced apart on the string 1002 to provide a predetermined position and depth of a formation current 1014 into the formation 1016. A continuous insulator member sleeve 1018 is coupled to the string 1002. In an embodiment, the insulator member sleeve 1018 is positioned on the drill string according to the method 200, discussed above. During ranging operations, the ranging device contact members 1010 and 1012 conductively contact the formation 1016 (e.g., the wall of a wellbore being drilled) at contact points 1010a and 1012a, while the insulator member sleeve 1018 may contact the formation 1016 (e.g., the wall of a wellbore being drilled) at an expected contact point or points as determined during the method 200 to provide a nonconductive contact that ensures that the formation current 1014 is not "shorted out" by contact between the string 1002 and the formation 1016.

Referring now to FIG. 11, a ranging system 1100 that may be operated according to the method 700, discussed above with reference to FIG. 7, is illustrated. As discussed above, the ranging system 1100 may be included on a drill string, BHA, and/or other drilling device known in the art. The ranging system 1100 includes a string 1102 having an insulator member sleeve 1104 coupled to the string 1102. A conductive ranging device window member 1106 is included on the insulator member sleeve 1104 and located adjacent a perimeter surface of the insulator member sleeve 1104. In an embodiment, the insulator member sleeve 1104 and conductive ranging device window member 1106 is positioned on the drill string according to the method 200, discussed above. During ranging operations, the string 1102 may deform (as predicted by the modeling and simulation of the method 200) to conductively contact the formation 1108 (e.g., the wall of a wellbore being drilled) at a ranging device contact point 1110 on the string 1102 and a ranging device contact point 1112 on the conductive window member 1106, while the insulator member sleeve 1104 may contact the formation 1108 (e.g., the wall of a wellbore being drilled) at the expected contact point or points determined during the method 200 to provide a nonconductive contact that ensures that a formation current between the ranging device contact point 1110 on the string 1102 and a ranging device contact point 1112 on the conductive ranging device window member 1106 is not "shorted out" by contact between other portions of the string 1102 and the formation 1108. In an embodiment, the configuration of the ranging system 1100 illustrated in FIG. 11 may be particularly useful in allowing Azimuthal contact for Azimuthal ranging operations.

Thus, a system and method have been described that determines a plurality of desired conducting contact points between ranging devices on a drill string or BHA and a formation for a particular drilling operation, such as magnetic ranging, and then simulates the drilling operation to determine the positioning of insulator members along the drill string or BHA to drive or otherwise promote contact between the drill string or BHA and the formation at the plurality of desired conducting contact points only. In an embodiment, the systems and methods described above allow the insulator members to be selected (e.g., the number of insulator members, positioning of the insulator members, size of the insulator members, shape of the insulators members, etc.) to urge a select portion of the drill string or BHA into contact with the wellbore walls, so as to promote conductive contact of the ranging devices at a particular conduction contact point with the formation. The systems and methods described above also allow the number of insulator members for a given drill string with desired conductive contacts points to be minimized or otherwise optimized for range system component positioning and operation.

Those skilled in the art will appreciate that one goal in such systems to balance the need for sensors and their particular functionality with the physical realities and directional requirements of the drilling operation. Thus, given a drill string or BHA necessary to perform a drilling operation, the systems and methods described above allow the optimization of all aspects of the ranging system, identifying the minimal need for placement of insulators.

Those skilled in the art will appreciate that use of the term "drill string" may include drillpipe, subs, the BHA and any other tools that might be attached thereto. Use of the term bottom hole assembly may include the drill bit, drill collars, stabilizers and the like.

A method for drilling a wellbore has been described that includes determining the drilling requirements for a desired wellbore in a particular formation, determining desired locations for placement of sensors along a drill string, said drill string including a bottom hole assembly, modeling the bottom hole assembly (BHA) by identifying bottom hole assembly components, the actual length of each bottom hole assembly component and the equivalent stiffness of each component, simulating the response of the modeled BHA during drilling of the wellbore in the particular formation, evaluating the BHA Profile in the wellbore to determine anticipated points of contact between the drill string and the wellbore, and identifying an insulator to be applied to at least one of said points of contact. In an embodiment, the step of determining the drilling requirements includes assessing the environment in which the wellbore will be drilled, which includes at least one of the following: formation characteristics, formation depth, formation make-up, formation temperatures and formation pressures. In an embodiment, the step of determining the drilling requirements includes at least one of the following: assessing the desired wellbore depth, the desired wellbore direction, the desired wellbore inclination, the desired wellbore diameter. In an embodiment, the step of determining desired locations includes identifying spacing between sensor components along a drill string. In an embodiment, the step of determining desired locations includes identifying desired contact points between sensor components and the sides of a wellbore. In an embodiment, the sensors are magnetic ranging sensors. In an embodiment, the magnetic ranging sensors include transmitters and receivers. In an embodiment, the magnetic ranging sensors include conductive centralizers capable of contacting the walls of the wellbore. In an embodiment, the bottom hole assembly includes a drill bit. In an embodiment, the step of simulating a response includes simulating a response of the BHA to at least one of the following: anticipated environment, directionality, inclination, or weight on bit. In an embodiment, the step of evaluating the BHA Profile includes evaluating at least one of the following: anticipate slope, anticipated deflection shear forces, or anticipated bending moments on the BHA In an embodiment, the method further includes evaluating harmonic frequencies of the BHA under anticipated drilling conditions to determine additional insulation requirements. In an embodiment, identifying an insulator includes determining at least one of the following: size of the insulator, shape of the insulator, or function of the BHA components.

In an embodiment, the method further includes applying an insulator to the drill string based on the determined points of contact. In an embodiment, the method further includes applying an insulator to the drill string at each determined points of contact. In an embodiment, the applying an insulator includes molding insulating material on at least a portion the perimeter of a drill string. In an embodiment, the applying an insulator includes attaching a prefabricated centralizer formed of insulating material to the drill string. In an embodiment, the step of evaluating harmonic frequencies further includes determining additional anticipated points of contact between the drill string and the wellbore based on the anticipated harmonic response of the BHA in the wellbore during drilling. In an embodiment, the method further includes applying an insulator to the drill string based on the determined points of contact arising from anticipated harmonic response determination. In an embodiment, the step of evaluating harmonic frequencies further includes evaluating harmonic frequencies over a range of drill bit speeds.

A method for drilling a wellbore has been described that includes providing a drill string including a bottom hole assembly having a drill bit, utilizing said drill string to drill a wellbore, utilizing said drill string to conduct electromagnetic signal propagation operations, utilizing centralizers attached to the drill string to form a conductive contact between the drill string and the walls of the wellbore, and utilizing insulators attached to the drill string to inhibit contact between the drill string and the walls of the wellbore. In an embodiment, the insulators enhance the electromagnetic propagation operations. In an embodiment, the method further includes the steps of determining anticipated points of contact between the bottom hole assembly and the sides of the wellbore during drilling of the wellbore and attaching an insulator to the bottom hole assembly at the anticipated points of contact. In an embodiment, the attachment points of respective centralizers and insulators on the drill string are selected to enhance magnetic ranging operations. In an embodiment, the step of utilizing said drill string to conduct magnetic ranging operations includes determining the spacing requirements for transmitters and receivers. In an embodiment, the spacing requirements are selected to control the depth of investigation of the magnetic ranging operations. In an embodiment, the spacing requirements are selected to control the directionality of the magnetic ranging operations. In an embodiment, the location of the insulators attaches to the drill string are selected to control the depth of investigation of the magnetic ranging operations. In an embodiment, the location of the insulators attaches to the drill string are selected to control the directionality of the magnetic ranging operations. In an embodiment, the utilizing insulators includes minimizing unintentional grounding between the BHA and the sides of the wellbore.

A system for drilling a wellbore in a formation has been described that includes a drill string including a bottom hole assembly having a drill bit, a plurality of spaced apart stabilizers in conducting contact with the formation, said stabilizers mounted on said drill string, and a plurality of insulators mounted onto the drill string, said insulators in non-conducting contact with the formation. In an embodiment, the insulators are molded onto the drill string. In an embodiment, the insulators are formed of carbon-fiber epoxy or fiberglass, fiber-reinforced epoxy or a non-conductive material. In an embodiment, an insulator includes stabilizer blades. In an embodiment, an insulator has a radial cross sectional area that is semi hemispherical in shape. In an embodiment, the insulator is donut shaped. In an embodiment, the stabilizer is integrally formed with the drill string.

A system for drilling a wellbore in a formation has been described that includes a drill string comprising a bottom hole assembly having a drill bit, a plurality of spaced sensors positioned along the drill string, said sensors including a transmitter, a receiver and stabilizers, wherein the stabilizers are in conducting contact with the formation, and a plurality of insulators mounted onto the drill string, said insulators in non-conducting contact with the formation.

A method for drilling a wellbore includes providing a drill string comprising a bottom hole assembly having a drillbit, identifying points along the drill string where it is desirable for the drill string to conductively contact the wellbore walls, identifying points along the drill string where it is desirable for the drill string to be isolated from conductive contact with the wellbore walls, and placing insulators on the drill string to urge the identified conductive points into contact with the wellbore walls when the drill string is in the wellbore. In an embodiment, the method further includes the step of placing insulators on the drill string at those points identified as requiring isolation from the wellbore walls. In an embodiment, the electromagnetic propagation operations are magnetic ranging operations.

Those skilled in the art will appreciate that while the present disclosure has been described in terms of magnetic ranging operations, the system and techniques of the present disclosure are also suitable for other types of operations dependent on controlled conductive contact between a formation and a drill string.

What is claimed is:

1. A method for providing a ranging system on a drill string, comprising:
   determining a plurality of drilling requirements for drilling a wellbore in a formation;
   determining a plurality of locations on a drill string to position ranging devices, wherein the drill string includes a bottom hole assembly (BHA);
   modeling the drill string using a plurality of drill string component details;
   simulating the response of the modeled drill string during drilling of the wellbore in the formation using the plurality of drilling requirements to create a drill string profile, the drill string profile indicating anticipated contact points between the drill string and wellbore;
   evaluating the drill string profile to determine at least one contact point between the drill string and the wellbore;
   identifying an insulator member to be positioned at the at least one contact point, the at least one contact point being between ranging devices;
   positioning the insulator member at the at least one contact point; and
   performing a ranging operation using the plurality of ranging devices.

2. The method of claim 1, where the determining the plurality of drilling requirements comprises determining at least one of the following: determining a plurality of formation characteristics, determining a formation depth, determining a formation make-up, determining a plurality of formation temperatures, and determining a plurality of formation pressures.

3. The method of claim 1, wherein the determining the plurality of drilling requirements comprises determining at least one of the following: a desired wellbore depth, a desired wellbore direction, a desired wellbore inclination, and a desired wellbore diameter.

4. The method of claim 1, wherein the determining the plurality of ranging device contact locations includes determining a spacing between the plurality of ranging device contact locations on the drill string.

5. The method of claim 1, wherein the determining the plurality of ranging device contact locations includes determining a plurality of desired contact points between a plurality of ranging devices and corresponding side portions of the wellbore.

6. The method of claim 1, wherein the simulating the response includes simulating a response of the BHA to at least one of the following: an anticipated environment, a directionality, an inclination, and a weight on bit.

7. The method of claim 1, wherein the evaluating the drill string profile includes evaluating at least one of the following: an anticipate slope, a plurality of anticipated deflection shear forces, and an anticipated bending moment on the drill string.

8. The method of claim 1, wherein the identifying an insulator member comprises identifying at least one of the following: a size of the insulator, a shape of the insulator, and a function of a plurality of drill string components.

9. The method of claim 1, further comprising:
   providing at least one insulator member to each respective contact point on the drill string such that at least one insulator member is positioned between a plurality of ranging devices contact locations on the drill string.

10. The method of claim 1, wherein the identification includes evaluating a plurality of harmonic frequencies of the drill string under a plurality of anticipated drilling conditions to determine a plurality of additional insulator member requirements.

11. A ranging system, comprising:
    a drill string comprising a bottom hole assembly (BHA);
    a plurality of ranging devices that are positioned in a spaced-apart orientation on the drill string and that are operable to provide a conducting contact with a formation; and
    at least one insulator member that is positioned on the drill string between the plurality of ranging devices and that is operable to provide a non-conducting contact with the formation,
    wherein the position of the ranging devices and insulator member is determined using any one of the methods of claim 1-4, 6, 7, 8, 9, or 10.

12. The system of claim 11, wherein the at least one insulator member is molded onto the drill string.

13. The system of claim 11, wherein the at least one insulator member includes a carbon-fiber epoxy, a carbon-fiber fiberglass, a fiber-reinforced epoxy, and a non-conductive material.

14. The system of claim 11, wherein the at least one insulator member includes a plurality of stabilizer blades.

15. The system of claim 11, wherein the at least one insulator member includes a semi hemispherical radial cross sectional area.

16. The system of claim 11, wherein the at least one insulator member includes a donut shape.

17. The system of claim 11, wherein the plurality of ranging devices are integrally formed with the drill string.

18. The system of claim 11, wherein at least one of the ranging devices comprises a contact member having a serrated section that provides conducting contact with the formation.

19. The system of claim 11, wherein the at least one insulator member includes a window member that provides a conducting contact with the formation.

20. The system of claim 11, wherein the insulator member is identified by evaluating a plurality of harmonic frequencies of the drill string under a plurality of anticipated drilling conditions to determine a plurality of additional insulator member requirements.

21. A method for drilling a wellbore comprising:
providing a drill string comprising a bottom hole assembly (BHA);
simulating a drill string operation, wherein the simulating comprises:
 determining a plurality of formation conduction points on the drill string; and
 determining at least one formation insulation point on the drill string that is located between the plurality of formation conduction points;
positioning a ranging device on each of the plurality of formation conduction points on the drill string;
positioning at least one insulator member on the at least one formation insulation point on the drill string; and
performing a ranging operation using the ranging devices, wherein the at least one insulator member provides an insulating contact with a wall of the formation during the ranging operation.

22. The method of claim 21, wherein the simulating further comprises:
simulating a drilling operation using a plurality of drilling requirements and a plurality of drill string component details.

23. The method of claim 21, wherein the insulator member is identified by evaluating a plurality of harmonic frequencies of the drill string under a plurality of anticipated drilling conditions to determine a plurality of additional insulator member requirements.

* * * * *